US006637312B1

(12) United States Patent  
Clucas et al.

(10) Patent No.: US 6,637,312 B1  
(45) Date of Patent: Oct. 28, 2003

(54) ASSEMBLY AND MOUNTING OF AN ENGINE DRIVE MECHANISM

(75) Inventors: Donald Murray Clucas, Christchurch (NZ); Rangi Amila Joshua De Abaffy, Christchurch (NZ)

(73) Assignee: Whisper Tech Limited, Christchurch (NZ)

( * ) Notice: Subject to any disclaimer, the term of this patent is extended or adjusted under 35 U.S.C. 154(b) by 0 days.

(21) Appl. No.: 09/868,977
(22) PCT Filed: Dec. 20, 1999
(86) PCT No.: PCT/NZ99/00222
§ 371 (c)(1), (2), (4) Date: Oct. 5, 2001
(87) PCT Pub. No.: WO00/37778
PCT Pub. Date: Jun. 29, 2000

(30) Foreign Application Priority Data

Dec. 22, 1998 (NZ) .................................. 333613

(51) Int. Cl.⁷ .................................................. F01B 3/02
(52) U.S. Cl. ................................. 92/12.2; 74/60
(58) Field of Search .................. 92/12.2, 71, 128, 92/499; 74/60

(56) References Cited

U.S. PATENT DOCUMENTS

| 1,722,726 | A | * | 7/1929 | Wills | 123/56.4 |
| 1,917,274 | A | * | 7/1933 | Shober | 74/60 |
| 2,940,325 | A | * | 6/1960 | Nakesch | 74/60 |
| 4,106,354 | A | | 8/1978 | Girodin | |
| 4,304,173 | A | * | 12/1981 | Brille | 92/12.2 |
| 4,491,057 | A | | 1/1985 | Ziegler | |
| 4,852,418 | A | | 8/1989 | Armstrong | |
| 5,630,351 | A | * | 5/1997 | Clucas | 92/71 |

FOREIGN PATENT DOCUMENTS

| AU | 7495/22 | of 1923 |
| WO | WO 94/27064 | 11/1994 |
| WO | WO 98/09057 | 3/1998 |

* cited by examiner

Primary Examiner—Edward K. Look  
Assistant Examiner—Thomas E. Lazo  
(74) Attorney, Agent, or Firm—Greer, Burns & Crain, Ltd.

(57) ABSTRACT

A mounting assembly for connection of a drive mechanism to an engine. The engine includes pistons, an engine block and an output shaft. The assembly includes a drive mechanism, connecting rods and a pedestal, whereby the assembly is mounted to the engine block and the rods are inserted into the cylinders. The pistons are then secured to the connecting rods. The pedestal includes means to locate the assembly on the engine block. The drive mechanism is preferably a wobble yoke with two beams, two lower yokes and a universal cross component. The pedestal is secured to the block through openings in the yoke.

18 Claims, 5 Drawing Sheets

ASSEMBLY AND MOUNTING OF AN ENGINE DRIVE MECHANISM

TECHNICAL FIELD

The present invention relates to the assembly of drive mechanisms for engines, more particularly a yoke mechanism. More particularly, it relates to improvements in the ease of assembly of both the components of a wobble yoke mechanism and of the wobble yoke mechanism itself into the engine.

The wobble yoke mechanism can be used in conjunction with internal or external combustion engines, compressors, refrigeration equipment, hydraulic pumps and the like. Preferably the present invention relates to a wobble yoke used with external combustion engines, and more preferably with Stirling engines.

BACKGROUND ART

Methods known to the applicant for fitting a drive mechanism, and specifically a yoke mechanism, to an engine do not lend themselves well to simple and efficient assembly. As will be understood, the use of a yoke mechanism (or drive mechanism, generally) in such an application, for converting the reciprocating motion of a piston of the engine to rotation of a crankshaft or vice versa, requires a mechanical connection between the piston and the yoke mechanism.

Typically such a connection in a conventional engine is performed with a connecting rod of a known type. Both ends of such rods are pivotally connected, one to the piston (by a gudgeon pin assembly) and the other to the yoke mechanism. Each piston and connecting rod, with associated components, are inserted into the respective cylinder. The yoke mechanism is then assembled piecewise onto the engine block and fixed to the connecting rods.

In applications such as Stirling engines, however, where connecting rod seals are present, the piston may only be inserted from one end of the cylinder, thus further limiting the options for providing a modular assembly which can be readily mounted to the engine.

It is equally desirable that these components can be quickly and easily disassembled from the engine block, for maintenance and repairs on the engine or wobble yoke assembly. Fitting the yoke mechanism in the manner described above is time consuming, it also requires technically precise workmanship, and this is a drawback which also increases manufacturing cost, since more costly skilled labor is required.

A similar problem exists in servicing the engine in the field, as anyone who needs to work on the engine and disassemble it, needs to do this delicate work on site. This can lead to difficulty, as often a repair and maintenance workman is not sufficiently skilled for this work. Further, in performing any repairs it is desirable to reduce to a minimum the time taken, as down time can be costly and disruptive. This is particularly true when the site of the engine is remote.

It is an object of the present invention to provide a yoke engine mount which overcomes these difficulties and which allows for ready assembly of the yoke mechanism and engine parts to the engine.

Another object of the invention is the provision of a yoke engine assembly that can be easily removed and replaced as a single unit, so that the engine may continue to operate with a replacement assembly while the malfunctioning assembly can be taken away for repair.

A further object of the invention is to improve the facility with which the components of the yoke mechanism itself may be assembled.

It is a still further object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a mounting assembly for connection of a drive mechanism to an engine wherein the said drive mechanism connects one or more pistons of an engine and an output shaft, the engine having an engine block, the drive mechanism being selected from the group: a wobble plate, a wobble yoke of a type described in WO 94/27064, and another wobble yoke mechanism; and wherein the drive mechanism includes a connecting rod for connection to each piston of the engine; said assembly including:

pedestal, to which the drive mechanism is mounted such that a torque reaction of the output shaft passes through the said pedestal, the pedestal being fixed to an output Shaft side of the engine block by releasable fastening means accessible only from the said output shaft side of the engine block; and whereby, each connecting rod includes means for releasable connection of said rod to a corresponding piston of the engine, characterized in that the connection of each rod to the respective piston is effected with the piston positioned within the respective cylinder of the engine.

According to another aspect of the present invention there is provided a mounting assembly for connection of a drive mechanism to an engine, as described above, wherein the pedestal includes:

a flange at one end adapted for mounting the pedestal to the engine block, said flange including a pattern of spaced apart holes, for receiving the fastening means therethrough, and a first part of a two part locating mean so said pattern matching a corresponding pattern of holes in the engine block; whereby a second part of the said two part locating means on the engine block, in conjunction with the said fasteners and flange, locates the said pedestal with respect to the engine block.

Preferably, the fastening means are screws and the holes in the engine block are screw threaded. Preferably the spanner used for the screws is a prismatic type, such as an Allen key.

According to another aspect of the present invention there is provided a mounting assembly for connection of a drive mechanism to an engine, as described above, wherein the drive mechanism includes openings therethrough adapted for the insertion of fastening means and tools.

According to another aspect of the present invention there is provided a mounting assembly for connection of a drive mechanism to an engine, as described above, wherein the mounting assembly further including a screw threaded section on each connecting rod for fixing the connecting rod to a corresponding threaded part of the piston.

According to another aspect of the present invention there is provided a mounting assembly for connection of a drive mechanism to the block of an engine, as described above, wherein said connecting rods are pivotally connected to a beam of the drive mechanism assembly, and wherein the centre of said pivotal connection describes a path having a small component perpendicular to a sliding axis of the piston; and wherein each said of connecting rods includes a profiled section having a lower bending stiffness in at least one plan than any adjacent sections of the rod.

This provides a flexure joint to assist in the assembly of the attached pistons into the said engine wherein this flexure joint also reduces the side thrust imposed on the piston by the connecting rod, due to the small component of the motion of said centre perpendicular to the sliding axis of the piston.

According to yet another aspect of the present invention there is provided an improved means of constructing a drive mechanism, as described above, wherein said drive mechanism is a wobble yoke of a type described in WO 94/27064, and the said pivotal connection between the pedestal and a first and a second beam is made between a known universal cross component and the said beam or beams, said cross being fastened by known means to the said pedestal.

Preferably, the said beams and yokes are manufactured using a casting process. Preferably, bearings connecting the first beam and a first yoke and the second beam and a second yoke include axial and radial load capacity. Preferably, said bearings are taper roller bearings. Preferably, a bearing fitted to or about the shaft of the engine is insensible to alignment errors. Preferably, the said bearing is a spherical roller bearing.

According to another aspect of the present invention there is provided a method of assembly for an engine, said method including the steps of:

(a) providing the engine, engine block, pistons and mounting assembly as described above;

(b) securing the components of the drive mechanism to the pedestal, and securing each connecting rod to the drive mechanism, thereby forming a sub-assembly;

(d) mounting the sub-assembly to the engine block, said mounting including guiding the second end of each connecting rod into the respective engine cylinder, and locating together the two part locating means;

(e) releasably securing the sub-assembly to the engine block with the fastening means; and (f) releasably securing each piston to the second end of the respective connecting rod.

According to a still further aspect of the present invention there is provided a method of assembly, as described above, wherein the drive mechanism is of a type described in WO 94/27064, having two beams and two lower drive mechanisms, wherein the method further includes before step (b), the step:

securing the lower yokes to the beams and the beams to a universal cross, which forms a component of the drive mechanism for mounting the drive mechanism to the pedestal.

According to another aspect of the present invention there is provided a method of replacement of a drive mechanism, rod and mounting assembly for an engine, said method including the steps of:

(a) providing an engine assembled by the above described method;

(b) unscrewing each of the pistons from the respective connecting rod;

(c) de-mounting the sub-assembly;

(d) replacing the sub-assembly; and (e) re-assembling the engine using the method of assembly described above.

BRIEF DESCRIPTION OF THE DRAWINGS

By way of example only, a preferred embodiment of the present invention will be described with reference to an external combustion Stirling engine and with reference to the accompanying drawings, in which.

BEST MODES FOR CARRYING OUT THE INVENTION

The present invention is described with reference to a drive mechanism which is a wobble yoke assembly 3 of a type described in WO 94/27064. This specification describes various embodiments of a wobble yoke assembly, these descriptions being incorporated herein by description. If so desired, however, other known types of wobble yokes and Stirling engines (and/or compressors and engines) may be used with varying numbers of pistons, and connecting rods. However, it will be appreciated by those skilled in the art that the scope of the invention is equally applicable to other types of drive mechanisms, for example: a swash plate, a wobble plate, and another wobble yoke mechanism.

Figure 1:
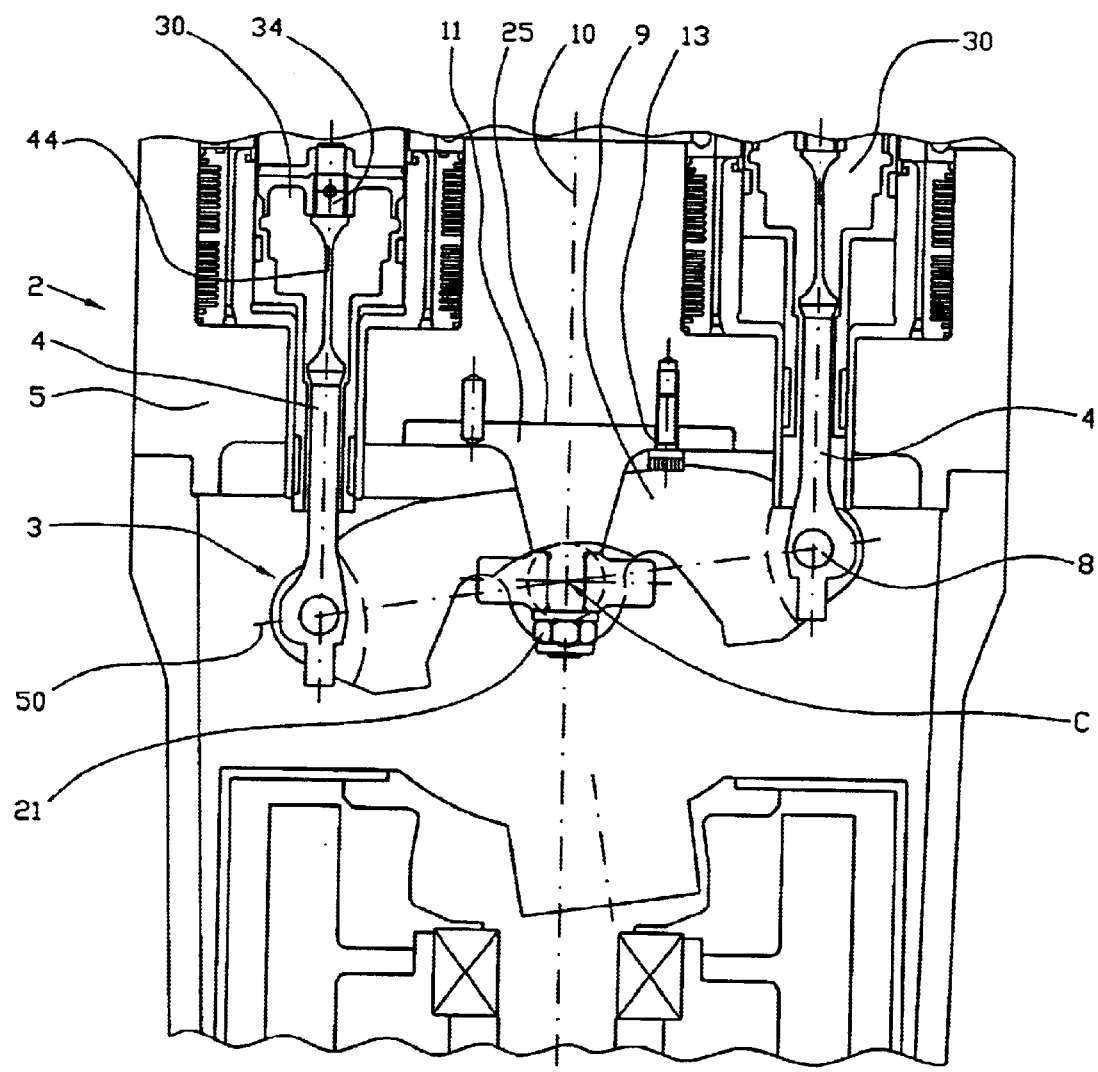
FIG. 1 is a partial side section through the centre of a Stirling engine, showing the wobble yoke in place.

FIG. 1 shows a section of a Stirling engine 2 with an engine block 5 containing four pistons 30. Each piston 30 is connected by a connecting rod 4 to a wobble yoke assembly 3, which assembly 3 is itself fixed to the engine block 5 and pistons 30, by means according to the present invention.

The description to follow will show how the wobble yoke assembly 3, the engine components 30, and the rods 4 are adapted for.ready assembly into the engine block 5. The assembly method involves putting together the wobble yoke 3 and the connecting rods 4 as a single module which can be then be fixed to the engine block 5, and to which the pistons 30 may be subsequently fixed. One advantage of this method is that it improves the ease and efficiency with which the assembly operation may be performed.

Figure 6:
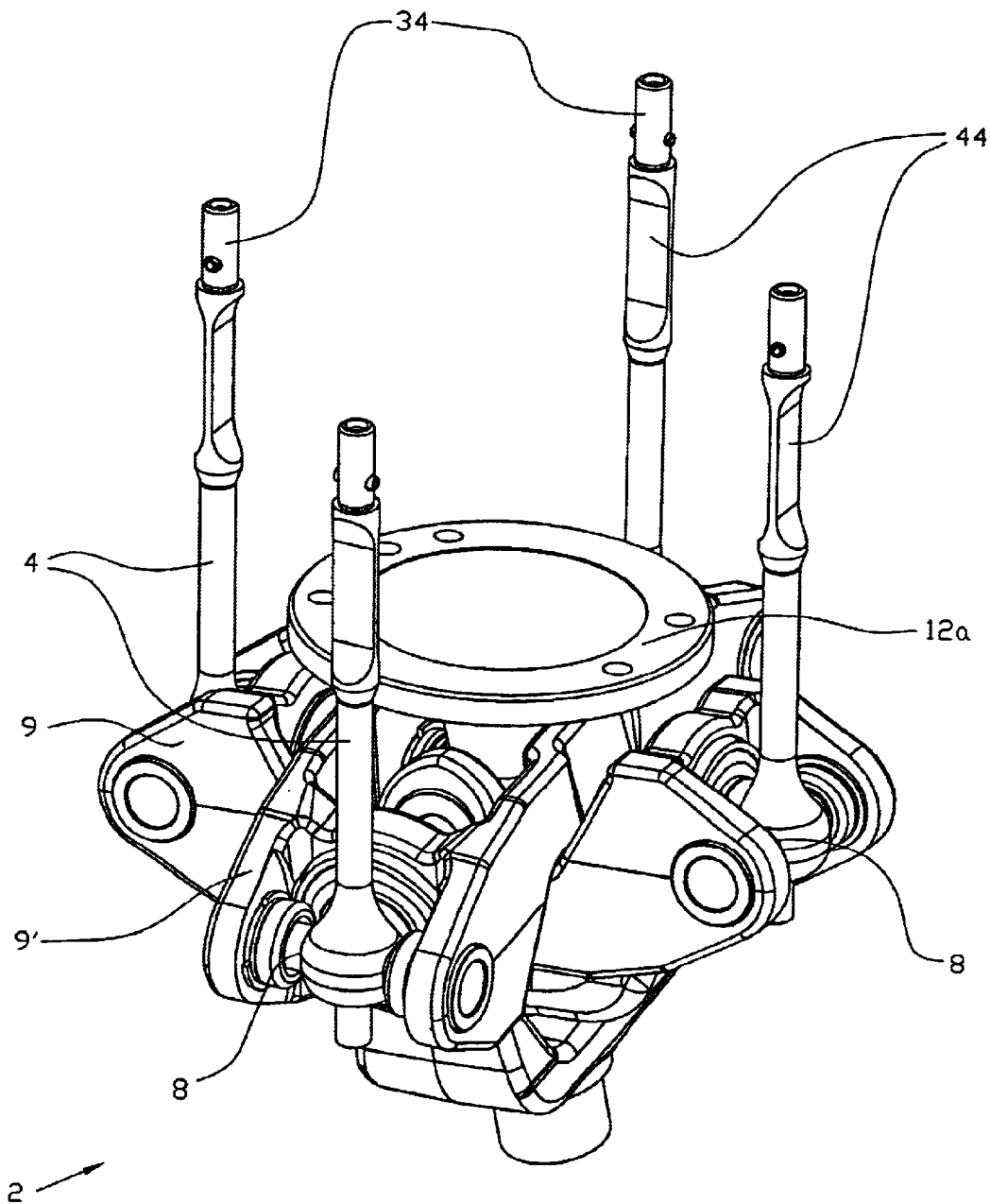
FIG. 6 is a perspective view of the complete assembly of the present invention, prior to fitting to an engine.

FIG. 1 illustrates connecting rods 4 according to the present invention, which are pivotally mounted to the wobble yoke assembly 3. Two connecting rods 4 are connected by bearings 8, one at each end of a beam 9 which oscillates about a first axis generally perpendicular to axis 50 and through centre C. Similarly, and partially illustrated in FIG. 6, the other two connecting rods 4 are also fixed in like manner to a second beam (9' FIG. 6), at right angles to said first beam 9. The connecting rods 4 include a profiled section 44 having a lower bending stiffness in at least one plane than adjacent sections of the rod, thus providing a flexure joint. This profiled section 44 provides flexure of the connecting rods 4 in the direction generally perpendicular to the axis 50. The connecting rods 4 also have screw threaded ends 34 for connection to the pistons 30.

Figure 2:
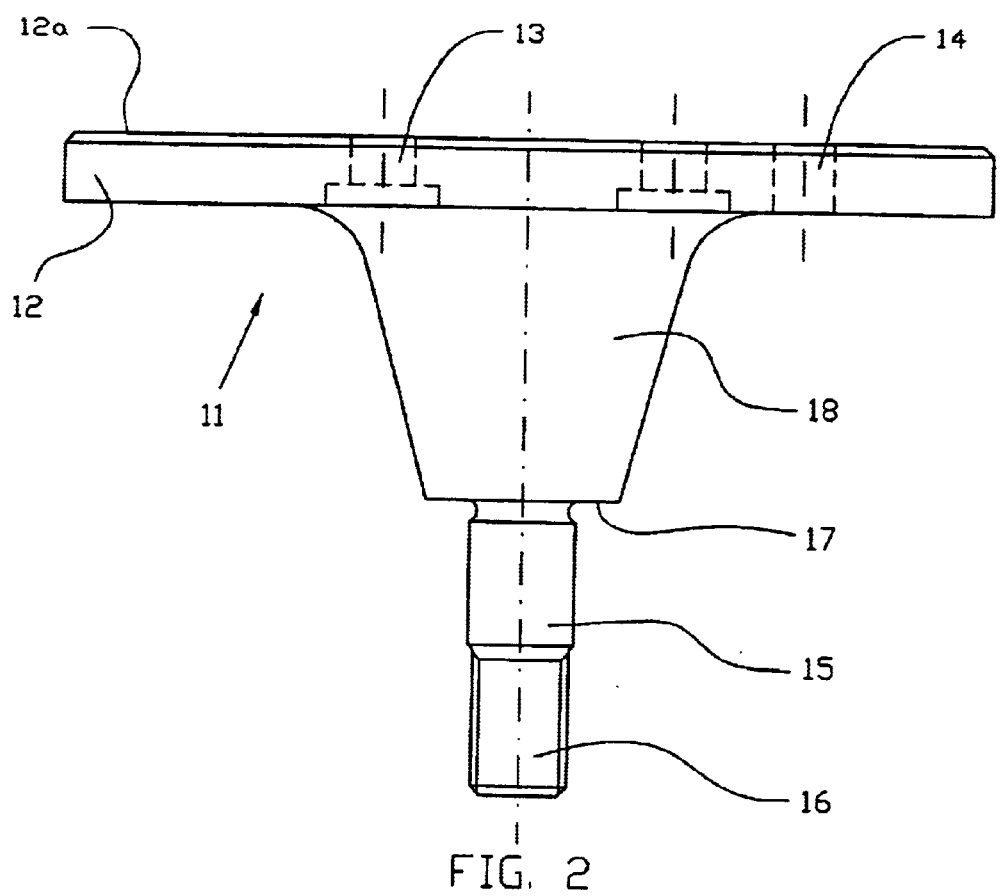
FIG. 2 is a side view of the pedestal of the present invention.
Figure 4:
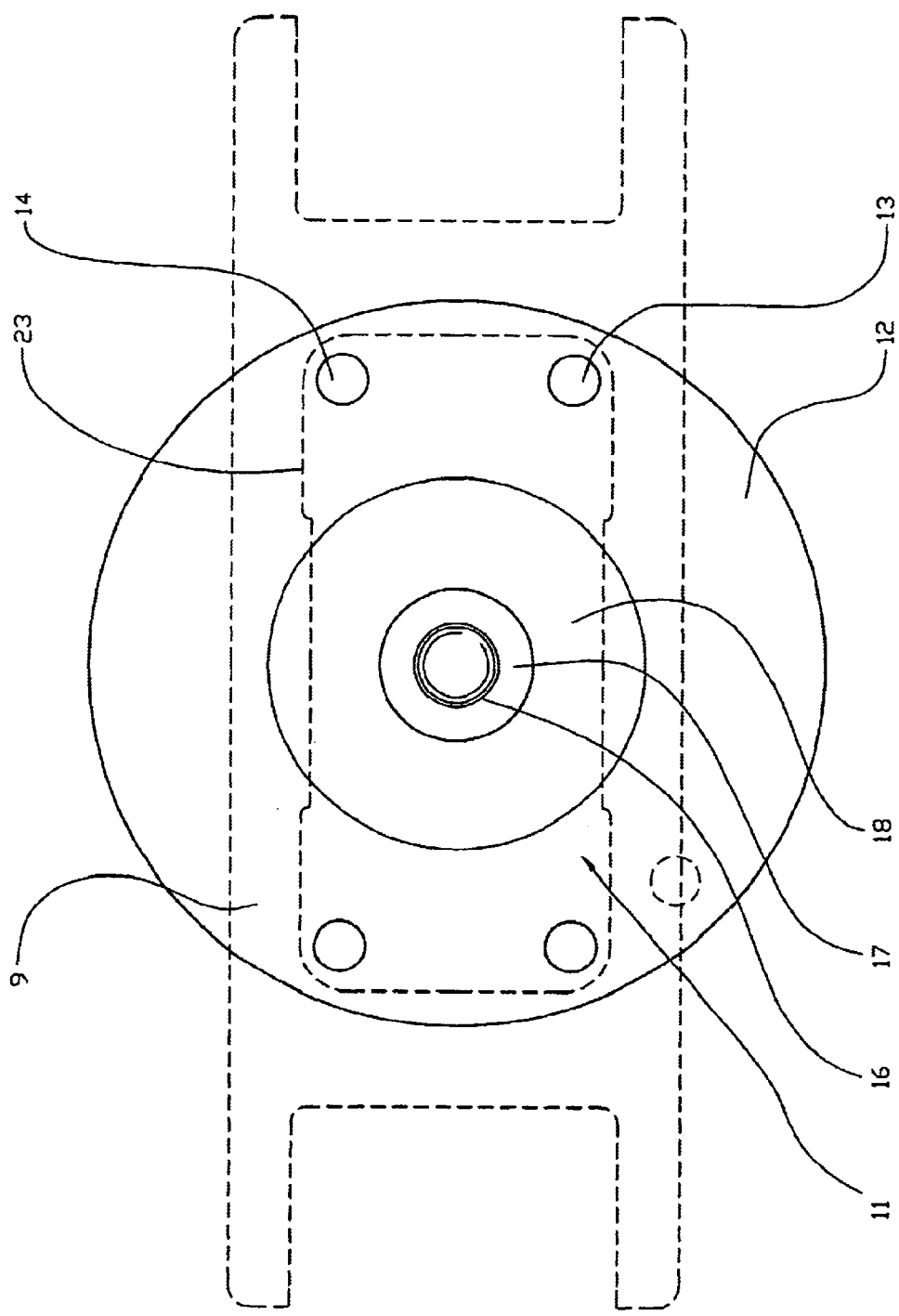
FIG. 4 is a view from underneath of the pedestal with part of the yoke shown in dotted outline.

Referring to FIGS. 1, 2 and 4, the pedestal 11 for mounting the wobble yoke assembly 3 (FIGS. 1 and 2) to the engine block 5 is there shown. The pedestal 11 includes a flat, circular collar 12 with a flat back 12a (FIG. 2) which bears against a flat face 25 on the engine block 5. The collar 12 includes therethrough a plurality of screw holes 13 adapted to receive screws, preferably Allen screws (not shown), for securing the pedestal 11 to the engine block 5. The pedestal 11 includes a keyhole 14 (FIGS. 2, 4) adapted to receive therethrough a complimentary male portion (not shown) of a locating key fixed to the engine block 5. The pedestal 11 also includes a straight-sided collar 15 and threaded end 16. Between the straight-sided collar 15 and circular collar 12 is a central portion 18 with a frustro-conical shape, and a shoulder 17 adjacent the straight sided collar 15.

Figure 3:
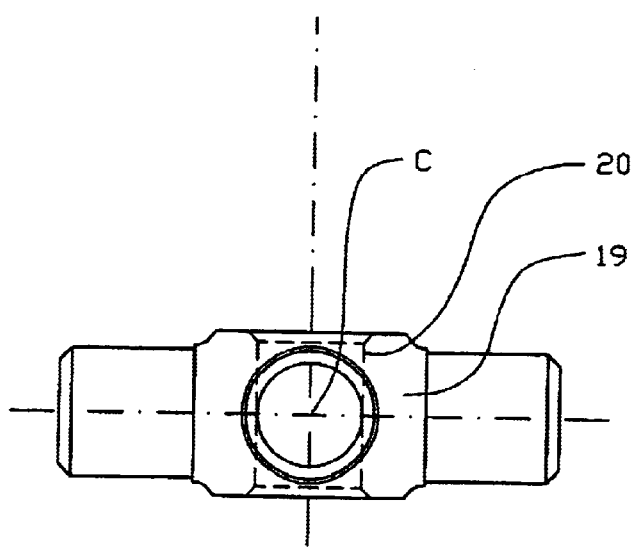
FIG. 3 is a side view of the universal cross portion of the wobble drive mechanism bearing of the present invention.

It will be appreciated by those skilled in the art that the shape of the central portion 18 may be varied from frustro-conical, as is desired. The wobble yoke assembly 3 includes a central cross-shape bearing mount component 19 (FIG. 3) which provides the two perpendicular axes about which the beams (9, 9') pivot, and the centre of which defines the centre C. The cross 19 includes a through hole 20 which is shaped to be inter-engaging with the straight sided collar 15 of the pedestal 11. The cross component 19 is secured to the pedestal 11, with, for example, an interference fit, and is also held against the shoulder 17 by nut 21 (FIG. 1). Preferably the cross 19 is adapted from a proprietary cross, of known type. If so desired, the pedestal 11 and cross 19 are keyed to each other, to prevent relative rotation.

Referring to. FIG. 4, when the wobble yoke assembly 3 is fixed on the pedestal 11, each screw hole 13 can be accessed with a tool and fastener (preferably an Allen screw and key) through the components of the wobble yoke assembly 3. To permit this access the beams 9, 9' of the wobble yoke assembly 3 includes a central cut-away portion 23 Shown in dotted outline on the beam 9 in FIG. 4).

During assembly, of the engine 2, with the wobble yoke assembly 3 fixed to the pedestal 11 and the connecting rods 4 attached. This combined component of the assembly 3, connecting rods 4, and pedestal 11 is ready to be mounted to the engine block 5. The connecting rods 4 are guided through the cylinder openings, the collar 12 and keyhole 14 readily locating the pedestal 11 relative to the engine block 5. The combined assembly is fixed by Allen screws to the engine block 5. The pistons 30 are inserted and screwed to the connecting rods 4.

This is a simple operation that could be readily performed on the production line by a person with little training. In a similar manner the disassembly re-assembly can also be readily performed. If, for example, the location of the engine 2 is remote, or if time is of the essence, a complete replacement unit comprising the pedestal 11 and yoke assembly 3 with connecting rods 4 can be re-inserted within the engine 2. Thus the down time for the engine 2 for repairs and maintenance can be kept to an absolute minimum.

Figure 5:
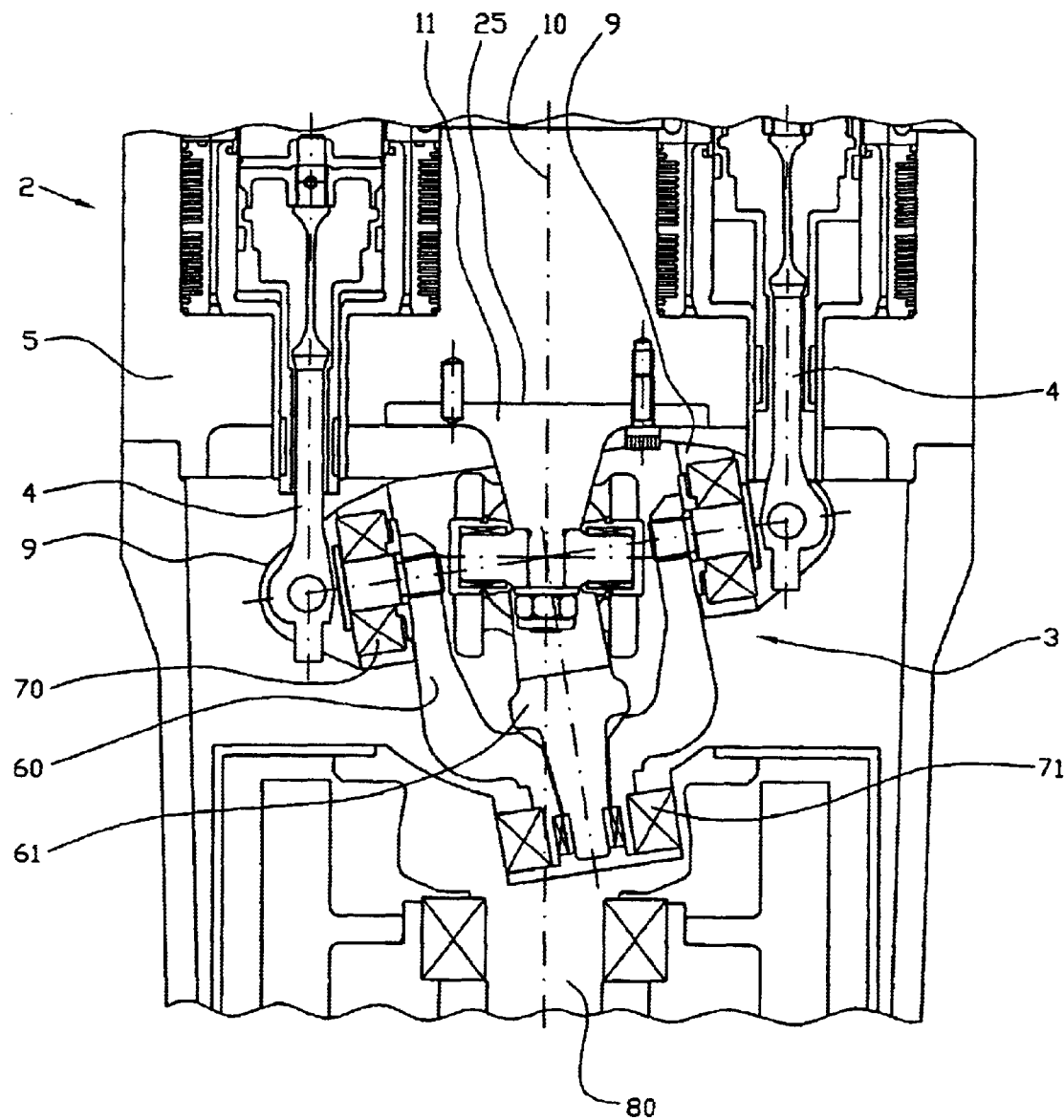
FIG. 5 is an elevation of the wobble yoke assembly of the present invention.

Other aspects relating to the assembly of the wobble yoke mechanism 3 itself are illustrated in FIG. 5. In a further embodiment, the bearings 70 connecting the first beam 9 and a first yoke 60 and the second beam (9', FIG. 6) and a second yoke 61 are taper roller bearings. A bearing 71 fitted to or about the crankshaft 80 is a spherical roller bearing.

The yoke mount assembly 3 is shown as assembled with two yokes (60, 61) (FIG. 5). It will be appreciated by those skilled in the art that the yokes (60, 61) may be either two separate yokes or a unitary component with a flexure between the two yokes.

Further, it will be appreciated by those skilled in the art that whilst the invention has been described with reference to he assembly of a wobble yoke of the type described in WO 94/27064, and with reference to four pistons 30, other yokes or plates, known in the industry, may be used in the assembly. Also, it will be appreciated that the number of pistons 30 may vary from four, be more or less, as is desired.

Whilst the yoke mount has been described with reference to a Stirling engine 2, it will be appreciated that it can be used with any form of external combustion engine for a wobble yoke or other yoked assemblage. Similarly, such pedestal 11 and mounting may also be used in an internal combustion engine, or with appropriate modification, in pumps and in compressors. Such modifications are of a type that are well within the ambit of the ordinary person skilled in the mechanical arts.

Aspects of the present invention have been described by way of example only and it should be appreciated that modifications and additions may be made thereto without departing from the scope thereof.

What is claimed is:

1. A drive mechanism for converting reciprocating motion to rotary motion, wherein the said drive mechanism is mountable to an engine and connects one or more pistons of an engine and an output shaft, the engine having an engine block, the drive mechanism including: a wobble plate or wobble yoke mechanism; the drive mechanism comprising:

a connecting rod for connection to each piston of the engine and a pedestal, to which the drive mechanism is mounted such that a torque reaction of the output shaft passes through the said pedestal; an assembled drive mechanism is removably fixable to the said engine block and each said piston of the engine without disassembly, wherein the pedestal is fixed to an output shaft side of the said engine block by releasable fastening means accessible only from the said output shaft side of the engine block; each connecting rod includes means for releasable connection of said rod to a corresponding piston of the engine, and the connection of each rod to the respective piston is effected with the piston positioned within the respective cylinder of the engine.

2. A drive mechanism as claimed in claim 1 wherein the pedestal includes:

a flange at one end adapted for mounting the pedestal to the engine block, said flange including a pattern of spaced apart holes, for receiving the fastening means therethrough, and a first part of a two part locating means; said pattern matching a corresponding pattern of holes in the engine block; whereby a second part of the said two part locating means on the engine block, in conjunction with the said fasteners and flange, locates the said pedestal with respect to the engine block.

3. A drive mechanism as claimed in claim 2 wherein said pedestal further includes:

a collar at the second end of the pedestal, said collar having a threaded end; and a central portion of frustro-conical shape, the base of the central portion being adjacent said flange; and a shoulder positioned between the collar and the central portion.

4. A drive mechanism as claimed in claim 2 wherein said flange is flat backed and adapted to bear against a flat surface on the engine mount.

5. A drive mechanism as claimed in claim 1 wherein said two part locating means includes a keyhole positioned in the flange of the pedestal and a projection of complementary shape on the engine block.

6. A drive mechanism as claimed in claim 1 wherein the drive mechanism includes openings therethrough adapted for the insertion therethrough of fastening means and tools.

7. A drive mechanism as claimed in claim 1 wherein each said connecting rod includes a screw-threaded section on the end connected to the respective piston, and each piston includes a corresponding screw threaded portion.

8. A drive mechanism as claimed in claim 1 wherein said connecting rods are pivotally connected to a beam of the drive mechanism assembly, and wherein the center of said pivotal connection describes a path having a small component perpendicular to a sliding axis of the piston; and wherein each said connecting rod includes a profiled section having a lower bending stiffness in at least one plane than any adjacent sections of the rod.

9. A drive mechanism as claimed in claim 1 wherein said drive mechanism is a wobble yoke mechanism including:

a central pivot point through which the torque reaction passes;

a first beam which pivots about said point via bearings in one plane, and to at least one end of which is pivotably attached at least one piston;

at least a first yoke connected to at least one end of said first beam via at least one first bearing the axis of which passes through the central pivot point, each said first bearing having one degree of freedom;

a second beam pivoting about said point via bearings in one plane to each end of which is pivotally attached at least one piston;

a second yoke at substantially 90° out of phase to the first yoke, said second yoke being connected to at least one end of said second beam via at least one second bearing the axis of which passes through the central pivot point, each said second bearing having one degree of freedom; and an eccentric bearing fitted to or about a mutating shaft, and connected to one end of each of the first and second yokes; wherein:

no bearing has more than one degree of freedom when in motion;

the axes of said eccentric, first and second bearings pass through the said central pivot point; and there is a degree of rotary freedom between the two yokes about the axis of the eccentric bearing and wherein the said central pivot point is a central pivot point of a known universal cross component.

10. A drive mechanism as claimed in claim 9 wherein said wobble yoke includes two lower yokes and both the beams and the yokes are manufactured using a casting process.

11. A drive mechanism as claimed in claim 9 wherein said lower yokes are formed integrally.

12. A drive mechanism as claimed in claim 9 wherein bearings connecting the first beam and a first yoke and the second beam and a second yoke include axial and radial load capacity.

13. A drive mechanism as claimed in claim 12 wherein said bearings are taper roller bearings.

14. A drive mechanism as claimed in claim 9 wherein a shaft bearing, fitted to or about the shaft of the engine is insensible to alignment errors.

15. A drive mechanism as claimed in claim 14 wherein said shaft bearing is a spherical roller bearing.

16. A method of assembly of an engine, said method including the steps of:

providing the engine (including engine block, pistons and output shaft), and drive assembly as claimed in claim 1;

securing the components of the drive mechanism to the pedestal, and securing each connecting rod to the drive mechanism, thereby forming a sub-assembly;

mounting the sub-assembly to the engine block, said mounting including guiding the second end of each connecting rod into the respective engine cylinder, and locating together the two part locating means;

releasably securing the sub-assembly to the engine block with the fastening means; and releasably securing each piston to the second end of the respective connecting rod.

17. A method of assembly of an engine as claimed in claim 16 wherein the drive mechanism is of a type claimed in claim 9, having two beams and two yokes, wherein the method further includes before step (b), the step:

securing the yokes to the beams and the beams to a universal cross, which forms a component of the yoke for mounting the yoke to the pedestal.

18. A method of replacement of an engine drive mechanism, said method including the steps of:

providing an engine assembled by the method as claimed in claim 16;

disconnecting each of the pistons from the respective connecting rod; de-mounting the sub-assembly;

replacing the sub-assembly; and re-assembling the engine using the method of assembly described above.

* * * * *